United States Patent Office 3,510,478
Patented May 5, 1970

3,510,478
15α - HALOGENO - 14β - HYDROXY-CARD-20(22) - ENOLIDES AND PROCESS FOR THEIR MANUFACTURE
Werner Fritsch, Neuenhain, Taunus, Werner Haede, Hofheim, Taunus, Kurt Radscheit, Kelkheim, Taunus, and Ulrich Stache, Hofheim, Taunus, Germany, assignors to Farbwerke Hoechst Aktiengesellschaft vormals Meister Lucius & Bruning, Frankfurt am Main, Germany, a corporation of Germany
No Drawing. Continuation-in-part of application Ser. No. 685,971, Nov. 27, 1967. This application July 30, 1968, Ser. No. 748,655
Claims priority, application Germany, Nov. 30, 1966, F 50,804
Int. Cl. C07c *173/02*
U.S. Cl. 260—239.57          1 Claim

ABSTRACT OF THE DISCLOSURE

3β - formoxy - 15α - halogeno - 14β - hydroxy-5β-card-20(22)-enolides and a process for their manufacture starting from 3-keto-5β-carda-14(15)-20(22)-dienolides.

The present application is a continuation-in-part application of application Ser. No. 685,971, filed Nov. 27, 1967, now abandoned. The present invention relates to 3β-formoxy-15α-halogeno-14β-hydroxy-5β-card - 20(22)-enolides and a process for their manufacture. Said process is characterized in that first 3-keto-5β-carda-14(15)-20(22)-dienolides are reduced with a complex metal hydride, the resulting 3α-hydroxy-5β-carda-14(15)-20(22)-dienolides are converted into the corresponding 3α-sulphonic acid esters and these are solvolyzed with an alkali metal formate in the presence of formic acid, water and dimethyl-formamide, and the resulting 3β-formoxy-5β-card-14(15)-20(22)-dienolides are reacted with N-halogen-amides under weakly acid conditions. The process of this invention takes the following course:

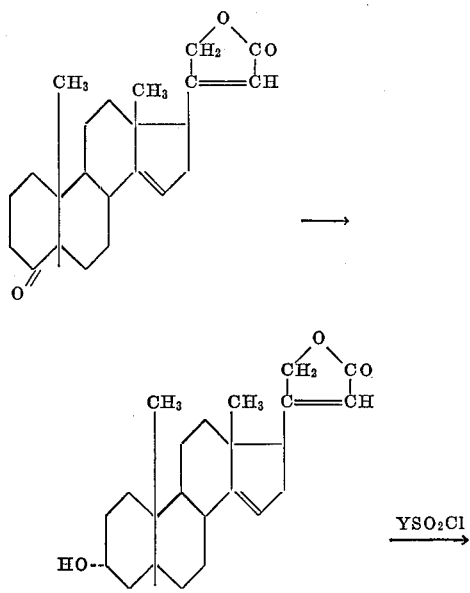

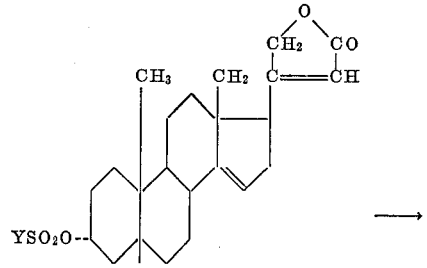

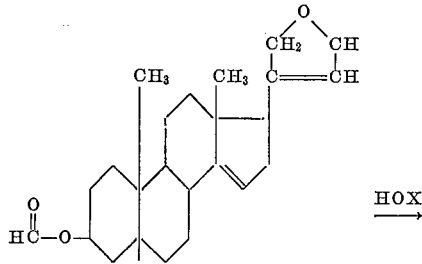

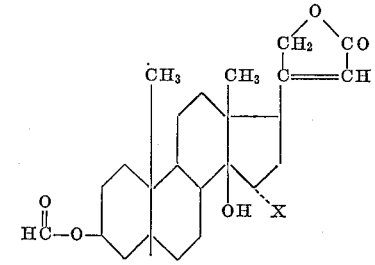

in which Y represents $CH_3$, —$C_6H_5 \cdot CH_3$, —$C_6H_5$ or other lower aliphatic or aromatic residues, and X stands for halogen, preferably bromine.

The 3-keto-5β-carda-14(15)-20(22)-dienolides used as starting materials, which may contain further substituents, for example acyloxy or alkyl groups in position 1, 2, 4, 7, 11, 12, 16 or 17, may be prepared for instance by the process of U.S. patent application Ser. No. 616,796, now U.S. Pat. No. 3,455,910 granted July 15, 1969.

The reduction of the 3-keto-5β-carda-14(15)-20(22)-dienolides to the 3α-hydroxy-5β-carda-14(15)-20(22)-dienolides in the first process step is carried out with a complex metal hydride, for example sodium borohydride or preferably lithium tritertiary butoxy-aluminum hydride (LTBA). The solvents used are those conventionally employed for such reductions, for example ether or preferably tetrahydrofuran. The reaction time ranges from one hour to several hours, and the temperature is within the range from —20° C. to the boiling temperature of the ether used, and is preferably 0° C.

The 3α-hydroxy-5β-carda-14(15)-20(22)-dienolides obtained in this manner are then reacted with sulphonylchlorides, for example methane-, benzene- or toluenesulphonylchloride, in the presence of a tertiary base, preferably pyridine, if desired or required in the presence of an organic solvent that is inert towards the reactants, for example acetone. The reaction is carried out within the temperature range from —10° C. to the boiling temperature of the solvent used, preferably at about 20° C. The reaction time at room temperature is 40 to 50 hours depending on the reaction temperature and the type of sulphonylchloride used.

The resulting crude 3α-sulphonic acid esters are advantageously solvolyzed—without first having been purified—in a mixture of an alkali metal formate, preferably potassium formate, water, formic acid and dimethylformamide. It is advantageous to use, for example, 2 parts of potassium formate, 0.35 part of water, 4.2 parts of formic acid and 14 parts of dimethylformamide for every part by weight of carda-dienolide, though other mixing ratios may likewise be used. It is advisable first to heat the mixture of the above-mentioned ingredients to the reaction temperature and then only to introduce the steroid into it. The reaction temperature is controlled by way of a heating bath. The reaction temperature ranges from 90 to 130° C. and is preferably 115° C. The reaction time ranges from 1 hour to several hours.

The variant of the present process surprisingly furnishes the 3β-formoxy-5β-carda-14(15)-20(22)-dienolides in good yields by a smooth reaction.

When, on the other hand, the above-mentioned 3α-sulphonic acid esters are reacted with a mixture of potassium acetate, water and glacial acetic acid in dimethylformamide—as described for the 3β-sulphonic acid esters of the 3β,14β-dihydroxy - 5α - card - 20(22) - enolides in Helv. chim. acta, vol. 42, p. 1502 (1959)—only low-melting mixtures are obtained which contain in addition to a small share of 3β-acetoxy-5β-carda-14(15)-20(22)-dienolide (yield below 10%) only the elimination product, that is to say the 3-desoxy-carda-3,14(15)-20(22)-trienolide and probably undesirable 17α-cardadienolides (formed by isomerization on C-17) from which the desired 3β-acetoxy-derivative can be separated only by numerous recrystallizations involving loss of material and by way of chromatography.

In contrast thereto the present process furnishes the desired 3β-formoxy derivatives in a substantially better purity. The crude product is much less contaminated by the above-mentioned corresponding elimination products, and any 17α-cardadienolides possibly formed by isomerization cannot be identified. The formoxy compound is, therefore, very simple and economical to purify.

An analogous reaction of the 3α-sulphonic acid esters of 5β-carda-14(15)-20(22)dienolides with potassium formate and formic acid without addition of dimethylformamide surprisingly did not furnish the desired 3β-formoxy derivate.

The resulting 3β-formoxy-5β-carda-14(15)-20(22)-dienolides are then reacted with hypohalous acid or with compounds that react like hypohalous acid, for example N-bromosuccimide, N-bromosuccinimide or other N-halogenamides in the presence of strong acids, for example perchloric acid, or preferably with N,N-dibromobenzenesulphamide in acetic acid. In the latter case the presence of perchloric acid, which as a strong acid causes partial hydrolysis of the acid-sensitive 3β-formoxy group, is not required.

The resulting 3β-formoxy-15α-halogen-14β-hydroxy-5β-card-20(22)-enolides are valuable intermediates for the manufacture of cardiac drugs, especially for the synthesis of digitoxigenin. For instance, 3β-formoxy-15α-bromo-14β-hydroxy-5β-carda-14,20(22) - dienolide is hydrogenated in the presence of a Pd-Raney-Ni-catalyst—which is treated previously with acetic acid—in a buffered organic solvent. The digitoxigenin formate so obtained is hydrolyzed according to Reichstein et al., Helv. Chim. Acta vol. 36, p. 985 (1953) to digitoxigenin.

The following example illustrates the invention, but it is not intended to limit it thereto.

EXAMPLE (a) 3α-hydroxy-5β-carda-14(15)-20(22)-dienolide 245 ml. of a solution of LiAl (tertiary $C_4H_9O)_3H$ solution in tetrahydrofuran, containing 49.7 g. of LiAl $(C_4H_9O)_3H$, are mixed under nitrogen with stirring and ice cooling with 5.65 g. of 3-keto-5β-carda-14(15)-20(22)-dienolide. The batch is then stirred for 1 hour at 0° C. and stirred into 2600 ml. of acetic acid of 5% strength while being cooled with ice, then extracted with methylenechloride and ether. The organic phase is washed with potassium bicarbonate solution and water, dried over sodium sulphate and evaporated to dryness under vacuum. Recrystallization of the distillation residue from methylene-chloride and ether furnishes 4.58 g. of 3α-hydroxy-5β-carda-14(15)-20(22)-dienolide melting at 186° C.

(b) 3α-hydroxy-5β-carda-14(15)-20(22)-dienolide tosylate 5.65 grams of 3α-hydroxy-5β-carda-14(15)-20(22)-dienolide are triturated with 6.9 g. of p-toluenesulphonylchloride and boiled under 0.8 mm. Hg pressure at 50° C. for 30 minutes. 90 ml. of absolute pyridine are then added at room temperature and the whole is stirred until everything has dissolved, then left to stand for 40 hours at room temperature. While stirring and cooling with ice, 92 g. of ice are added. After stirring for a short time the precipitated crystals are recovered by vacuum filtration and thoroughly washed with water and dried at 450 C. under vacuum, to yield 7.95 g. of tosylate which is sufficiently pure for the further reactions.

(c) 3β-formoxy-5β-carda-14(15)-20(22)-dienolide 6.15 grams of 3α-hydroxy-5β-carda-14(15)-20(22)-dienolide tosylate are added at a bath temperature of 115° C. under nitrogen to a mixture of 12 g. of potassium formate, 2.15 ml. of water, 25.5 ml. of formic acid and 88 ml. of dimethylformamide. The batch is stirred for 1½ hours at this temperature, then cooled and concentrated to half its volume at a bath temperature of 95° C. under a pressure of 30 mg. Hg, then stirred into about 300 ml. of water. The precipitate formed is filtered off, washed with water seven times, taken up in methylenechloride, washed copiously with water, dried over sodium sulphate and evaporated to dryness under vacuum. Two recrystallizations from methylenechloride+ether furnish 2.4 g. of 3β-formoxy-5β-carda-14(15)-20(22)-dienolide melting at 194 to 196° C.

(d) 3β-formoxy-15α-bromo-14β-hydroxy-5β-carda-20(22)-enolide

While cooling with ice, a solution of 2.51 g. of 3β-formoxy-5β-carda-14(15)-20(22)-dienolide in 82 ml. of dioxane is mixed with 1.8 ml. of glacial acetic acid, then with 15 ml. of water and finally with 1.03 g. of N,N-dibromobenzenesulphamide (freshly crystallized) in rapid succession. The batch is stirred for 1 hour while being cooled with ice and with exclusion of light and the reaction mixture is stirred into 120 ml. of ice water. The precipitate formed is recovered by vacuum filtration, thoroughly washed with water and dried under a high vacuum at 25° C. The resulting 3β-formoxy-15α-bromo-14β-hydroxy-5β-card-20(22)-enolide weighs 2.67 g. and melts at 140–145° C. (on a Kofler heater) with decomposition. Bromine content: calculated 16.6%, found 16.8%.

What we claim is:

1. A process for making a 3β-formoxy-15α-bromo-14β-hydroxy-5β-card-20(22)-enolide which comprises reducing a 3-keto-5β-carda-14(15)-20(22)-dienolide with a complex metal hydride selected from the group consisting of sodium borohydride and lithium tritertiary butoxy-aluminum hydride to form a 3α-hydroxy-5β-carda-14(15)-20(22)-dienolide; esterifying the hydroxy group to form the corresponding 3α-sulfonic acid ester; solvolyzing the ester with potassium formate in the presence of formic acid, water, and dimethylformamide; and reacting the resulting 3β - formoxy - 5β - carda-14(15)-20(22)-dienolide with an N-bromoamide under weakly acid conditions.

References Cited

Ishii et al., Chem. & Phar. Bull., vol. 11, p. 578 (1963).
Engel et al., Steroids, June 1964, pp. 601–606.

HENRY A. FRENCH, Primary Examiner

U.S. Cl. X.R.

260—999